US00RE34849E

United States Patent [19]

Sanders

[11] E Patent Number: Re. 34,849

[45] Reissued Date of Patent: Feb. 7, 1995

[54] LEAF BAGGING EQUIPMENT

[76] Inventor: Stephen Sanders, 1569 Harpers Cove La., Reston, Va. 22094

[21] Appl. No.: 151,948

[22] Filed: Nov. 15, 1993

Related U.S. Patent Documents

Reissue of:

[64] Patent No.: 5,066,143
Issued: Nov. 19, 1991
Appl. No.: 605,000
Filed: Oct. 29, 1990

U.S. Applications:

[63] Continuation-in-part of Ser. No. 388,505, Aug. 2, 1989, abandoned.

[51] Int. Cl.[6] ..... B65D 30/10; B65D 33/06; B65D 33/28

[52] U.S. Cl. ..... 383/4; 383/7; 383/75

[58] Field of Search ..... 383/4, 7, 75, 77, 72, 383/76

[56] References Cited

U.S. PATENT DOCUMENTS

| | | | |
|---|---|---|---|
| 1,234,318 | 7/1917 | Erickson | 383/7 |
| 1,385,695 | 7/1921 | MacCormack et al. | 383/4 |
| 1,683,678 | 9/1928 | Kitterman et al. | 383/75 |
| 2,766,797 | 10/1956 | Cowen | 383/76 |
| 2,781,811 | 2/1957 | Dilar et al. | 206/423 |
| 2,850,842 | 9/1958 | Eubank, Jr. | 206/83.5 |
| 4,315,535 | 2/1982 | Battle | 53/464 |
| 4,337,812 | 7/1982 | Trinker | 383/4 |
| 4,471,600 | 9/1984 | Dunleavy | 53/390 |
| 4,738,545 | 4/1988 | Westgor | 383/75 |
| 4,794,029 | 12/1988 | Tennant et al. | 383/4 |
| 4,799,520 | 1/1989 | Blackburn et al. | 206/423 |
| 4,895,742 | 1/1990 | Schaub et al. | 383/4 |
| 4,938,607 | 7/1990 | Kelley | 383/75 |
| 4,955,068 | 9/1990 | Tennihan | 383/4 |

FOREIGN PATENT DOCUMENTS

| | | | |
|---|---|---|---|
| 273619 | 10/1913 | Germany | 383/4 |

*Primary Examiner*—Stephen P. Garbe

[57] ABSTRACT

A leaf collecting and bagging assembly is made up of flexible plastic sheet having a draw string along its perimeter and capable of being spread out on the ground to serve as a leaf collecting surface and then converted into a bag by drawing the draw string to contain the leaves for discarding along with the bag.

4 Claims, 3 Drawing Sheets

LEAF BAGGING EQUIPMENT

Matter enclosed in heavy brackets [ ] appears in the original patent but forms no part of this reissue specification; matter printed in italics indicates the additions made by reissue.

This is a continuation-in-part of application Ser. No. 07/388,505, filed Aug. 2, 1989 now abandoned.

CROSS-REFERENCE

Leaf Bagging Equipment and Method—U.S. Pat. No. 4,471,600.

BRIEF SUMMARY OF INVENTION

This invention provides substantially circular plastic sheets adapted to be formed into bags. Such sheets having handle shaped extensions at diametrically opposite locations on its perimeter and a continuous hem and draw string enclosed therein.

BACKGROUND

The use of plastic bags having draw strings for yard work such as leaf collection is especially difficult without the use of either another individual or some sort of rigid mechanism to hold the bag. One type of rigid mechanism is a trash container that houses the plastic bag. The use of the trash container often creates the problem of not being able to extract the bag from the container because the compressed leaves in the bag are pushing against the inside wall of the container. Another type of rigid mechanism to hold the plastic bag is a metal frame. The problem with this is that often the bag tears when being used. A solution to these problems is to use a flat sheet having a draw string and place the leaves onto this sheet and then draw the draw string thereby transforming the sheet into a bag to contain the leaves. This sheet can have different shapes, i.e. rectangular, or circular. The disadvantage of a rectangularly shaped sheet is: it creates less volume for a given area than that of a circular sheet; it is more difficult to use, i.e. four corners have to be manipulated; it does not always work, i.e. if less than all four corners are manipulated, the sheet will not transform into a bag—a corner not accessed will gather under the load of leaves instead of over the load of leaves. The advantage of a circular shaped sheet is: it creates more volume for a given area than that of a rectangular sheet; it is easier to use, i.e. only two locations have to be manipulated; it always works. A draw string that is approximately the same size as the perimeter of the sheet has the advantage of being the shortest possible length. However, to use this type of draw string it must be pulled outward from the sheet. Incorporating this requirement into the use of circular sheets has lead to this invention. This invention uses a circular sheet having a draw string but also provides two handle shaped extensions located diametrically opposite each other along the perimeter of the circular sheet that are used to 1) maintain a grasp on the sheet so that the draw string may be pulled outward from the sheet, 2) reduce the stress on the draw string at a critical time when the sheet is being transformed into a bag, and 3) determine the proper size of the load of leaves.

DETAILED DESCRIPTION

Figure 1:
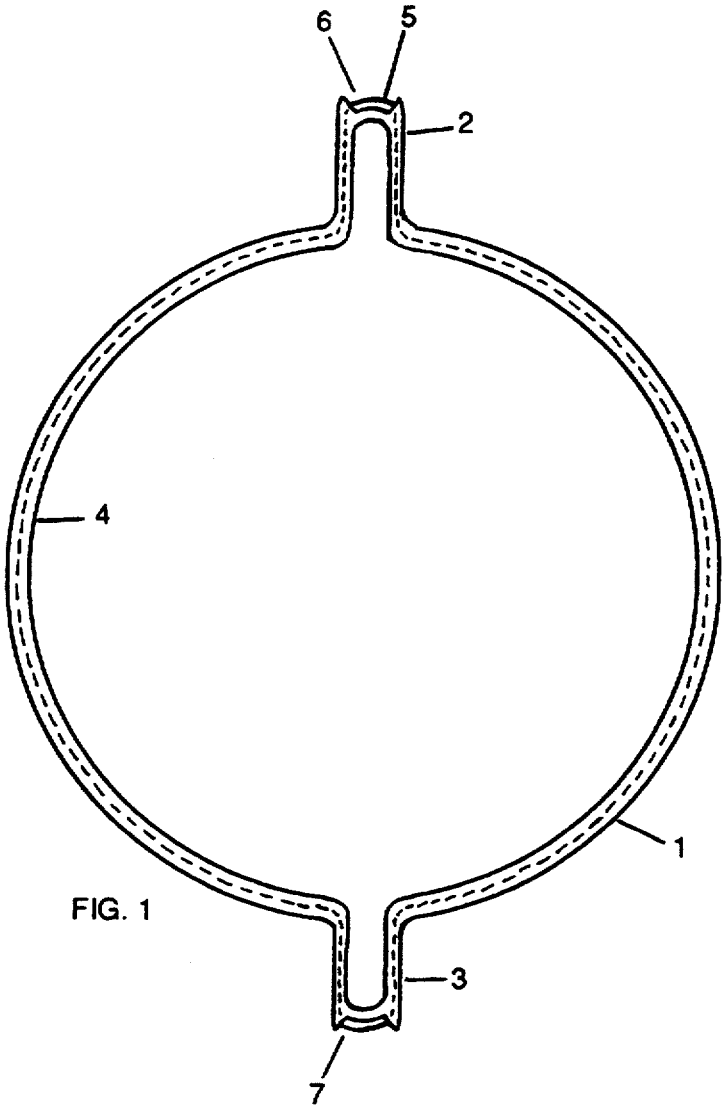
FIG. 1 is a top view of a substantially circular flexible plastic sheet 1 having two handle shaped extensions 2 and 3, hereafter called handles, located diametrically opposite each other along the perimeter of the sheet. The hem line 4 where the plastic sheet is permanently folded over to enclose the draw string or draw tape 5, hereafter referred to as draw string, is shown. The openings 6 and 7 cut in the hem at each handle allow access to the draw string 5. The non accessible portion of the draw string is shown by broken lines.
Figure 2:
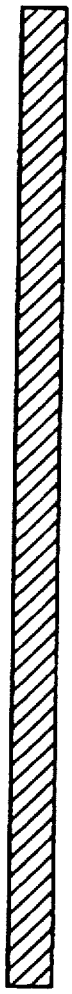
FIG. 2 is a side view showing the thickness of the flexible plastic sheet 1.

Referring first to the preferred structure of FIGS. 1 to 5, it is made up of a flexible plastic sheet 1. The flexible plastic sheet 1 is substantially circular with two handle shaped extensions 2 and 3, hereafter referred to as handles, located diametrically opposite each other along the perimeter of the plastic sheet 1.

A good size for the flexible plastic sheet 1 is 6 feet in diameter but may be smaller or larger to fit the particular use that is contemplated. An appropriate thickness of the plastic is 1.5 mil (0.0015 inch) but may be thinner or thicker to fit the particular use that is contemplated.

A permanent hem at substantially the entire perimeter of the flexible plastic sheet 1 provides a channel 4. A draw string 5 is enclosed in the channel 4. The draw string 5 has length less than that of the length of the perimeter of the plastic sheet 1. The draw string 5 will not extend beyond the perimeter of the plastic sheet 1 when the plastic sheet 1 is laid out flat. Because of this, the draw string must be pulled outward from the handles 2 and 3 in order for a bag to be formed from the plastic sheet 1. The draw string 5 may be made of plastic material or other types of flexible material.

Figure 4:
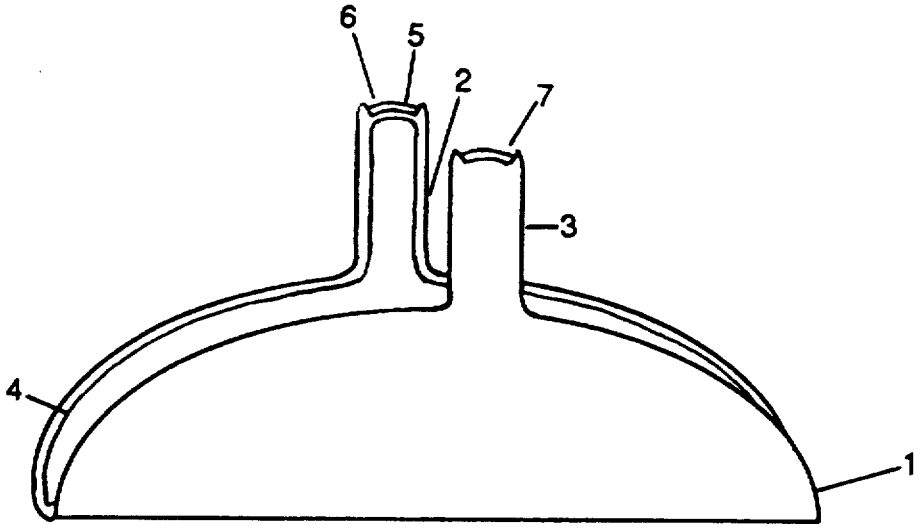
FIG. 4 is a perspective view showing the sheet 1 in a position that sandwiches the leaves 8 (hidden in figure).
Figure 3:
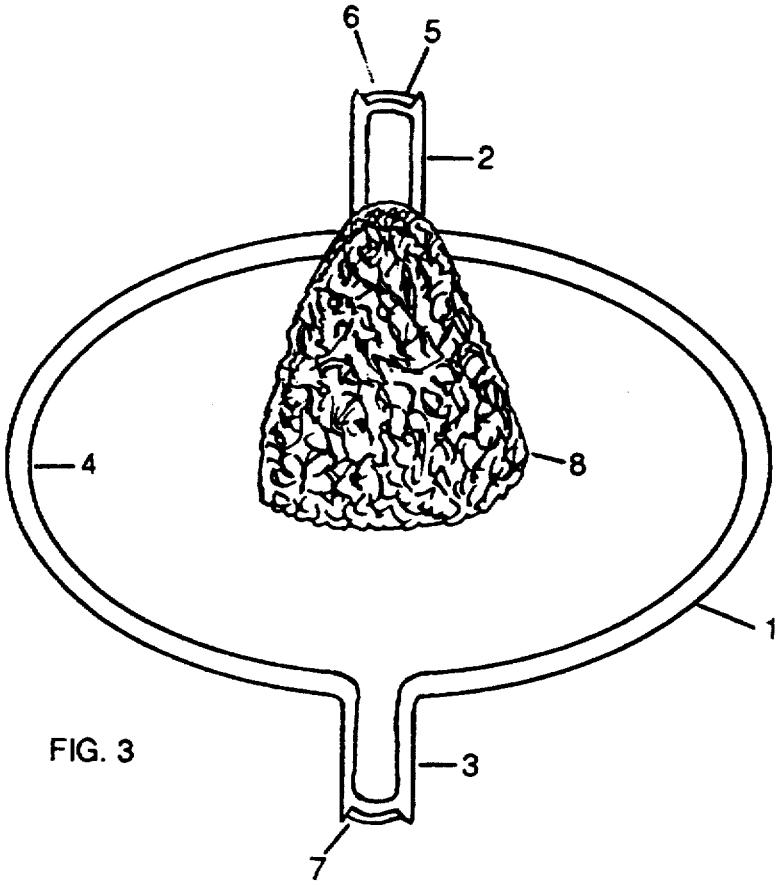
FIG. 3 is a perspective view showing the leaves 8 placed in the center portion of the flexible plastic sheet 1.
Figure 5:
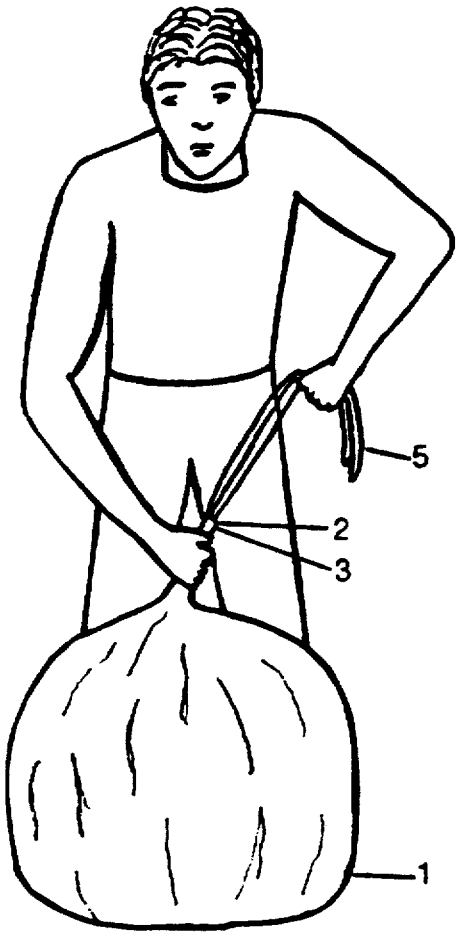
FIG. 5 is a perspective view showing the handles 2 and 3 grasped and the draw string 5 pulled outward from the handles 2 and 3 thereby forming a bag like shape which encloses the leaves 8.

The use of the flexible plastic sheet 1 is shown in FIGS. 3 to 5. In FIG. 3 the flexible plastic sheet 1 is spread out flat on the ground. The leaves 8 are then gathered or placed onto the center portion of the flexible plastic sheet 1 until they are piled quite high.

The next step is shown in FIG. 4 where the sides of the flexible plastic sheet 1 are lifted at the handles 2 and 3 to sandwich in the leaves 8 (hidden in the figure). The handles 2 and 3 are used in this step to determine if the size of the pile of leaves 8 are too large to be contained. If the handles 2 and 3 are higher than the leaves 8 and can be placed together, then the leaves can be contained. If the handles 2 and 3 are not higher than the leaves 8, then the leaves 8 must be compressed or some leaves 8 must be removed so that the handles 2 and 3 can be placed together.

The next step is shown in FIG. 5 where the handles 2 and 3 are grasped and the draw string 5 is pulled outward from the handles 2 and 3 to form a bag like shape which encloses and contains the leaves 8. The handles 2 and 3 provide a convenient part of the sheet 1 to hold in order to pull the draw string 5 outward. The handles 2 and 3, when grasped, reduces the stress on the draw string 5 when being drawn.

The bag with the contained leaves 8 can then be stored or discarded.

I claim:

1. A single flat-lying substantially circular flexible [plastic] sheet with two handle shaped extensions, hereafter referred to as handles, located diametrically opposite each other along the perimeter of the said [plastic] sheet, said sheet completely covering the area within its entire said perimeter, said sheet being hemmed at substantially the entire said perimeter thereof to form a channel, a continuous draw string or draw tape, hereafter referred to as draw string, enclosed in said channel, openings in said channel at said handles to expose said draw string, the length of said draw string being less than the length of the said perimeter of the said sheet, said draw string used to form said sheet into a bag.

2. A sheet according to claim 1 wherein said sheet comprises [polyethylene or polypropylene] *plastic.*

3. A bag formed from a flat sheet according to claim 1.

*4. A sheet according to claim 1 wherein said sheet comprises polyethylene or polypropylene.*

* * * * *